March 30, 1926.
M. VAN N. ALTVATER
1,579,052
FRUIT PICKER
Filed July 3, 1925
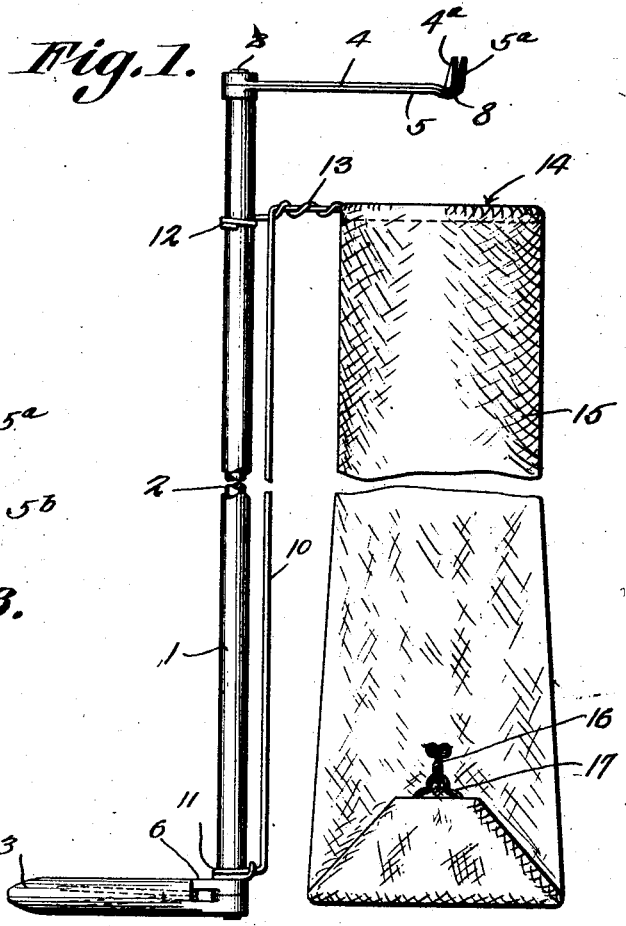
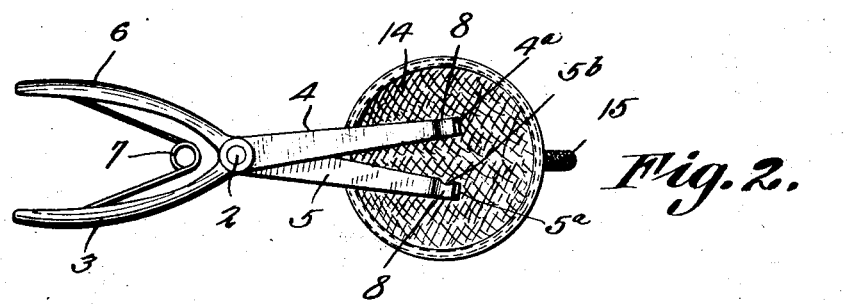
Inventor
Maude Van Norman Altvater
By C. A. Snow & Co.
Attorneys Patented Mar. 30, 1926.

1,579,052

UNITED STATES PATENT OFFICE.

MAUDE VAN NORMAN ALTVATER, OF GRANT ORCHARDS, WASHINGTON.

FRUIT PICKER.

Application filed July 3, 1925. Serial No. 41,308.

*To all whom it many concern:*

Be it known that I, MAUDE VAN NORMAN ALTVATER, a citizen of the United States, residing at Grant Orchards, in the county of Grant and State of Washington, have invented a new and useful Fruit Picker, of which the following is a specification.

This invention relates to fruit pickers by means of which fruit is clipped or picked and dropped into containers carried thereby for that purpose.

The object of the invention is to provide a simply constructed fruit picker whereby an apple or a pear may be snipped in the hollow and dropped into the receiving bag thereby avoiding bruising and also avoiding stem puncture when the apples are packed.

Another object is to provide a picker of this character which may be actuated by a person standing on the ground and whereby he may be enabled to reach fruit located at ordinarily inaccessible points and which avoids bruising of the fruit in its transfer from the tree to boxes or other containers.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a fruit picker constructed in accordance with this invention, parts being broken out;

Figure 2 is a top plan view thereof with the clipping blade shown open ready to receive the stem of fruit to be cut; and Figure 3 is an end view of one of the cutting blades.

In the embodiment illustrated, the picker constituting this invention comprises a tubular pole 1 having a rod 2 rotatably mounted therein and extending slightly beyond the opposite ends of the tube to provide for the mounting thereon of a handle member 3 at one end and a cutting blade 4 at the other end. This handle and blade are fixed to the rod 2 to turn with it for a purpose presently to be described.

The tube 1 is also provided at its opposite ends with a cutting blade 5 and a handle 6 which are fixedly secured to said tube and extend laterally therefrom, the blade 4 carried by the rod overlying the blade 5 while the handle 6 carried by the tube overlies the handle 3 of the rod. A spring 7 is arranged between the handles 3 and 6 and exerts its tension to force them apart and thereby opens the blades 4 and 5 into the position shown in Fig. 2.

The free ends of the blades 4 and 5 are bent upwardly substantially at right angles as shown at 4ª and 5ª, said upbent portions having downwardly curved bowls 8 which fit one over the other and are designed to enter the hollow in the stem end of an apple so as to clip the stem thereof as close to the apple as possible. The fixed blade 5 has a notch 5ᵇ in its cutting edge as is shown clearly in Fig. 2 and which is designed to receive the stem of the apple and hold it against lateral movement while being cut.

The cooperating edges of the upturned ends 4ª and 5ª of the cutting blades are curved as shown in Figure 3 to facilitate their cutting operation.

A rod 10 preferably constructed of heavy wire is arranged parallel with the rod 1 and is provided at its opposed ends with loops 11 and 12 which loosely encircle tube 1 to provide for the rotary and longitudinal movement of rod 10 relatively to the tube.

A laterally extending arm 13 is carried by the upper end of wire 10 and merges into a loop 14 here shown circular and preferably composed by extending the wire from which the rod upright portion 10 is made and then twisting said wire to form the arm 13 with the terminal of the wire wrapped to form the loop 12.

A flexible tube or bag 15 is carried by the loop 14 and is designed to receive the fruit cut off by the blades 4 and 5. This bag 15 has its lower end open and equipped with means for closing it, said means being here shown in the form of a hook and eye 16 and 17, one carried by the body portion of the tube or bag 15 and the other by its lower end so that when said lower end is folded up and the eye engaged with the hook as shown in Fig. 1 the open end of the bottom of the tube will be closed so that the fruit dropped into the tube will be held until it is desired to release it.

The wire or rod 10 is made shorter than tube 1 so that the mouth 14 of the tubular bag 15 may be positioned below the cutting blades and spaced therefrom a sufficient distance to permit an apple or pear to be entered between the blades and said bag and after the blades have been engaged with the fruit the bag may be moved upwardly by sliding the rod 10 forwardly on tube 1 and then allowed to drop back into place after the cutting of the fruit.

This picker is extremely simple in construction and easily operated having few parts which are liable to become broken or get out of use and will effect a great saving in fruit during the picking season.

I claim:—

1. A fruit picker comprising a tubular member with a rod arranged to rotate therein, said rod extending at its ends beyond the ends of the tubular member, a handle fixed to one end of the tubular member and a cooperating handle carried by the projecting end of the rod, a spring mounted between said handles to normally force them apart, a laterally extending cutting blade carried by the other projecting end of the rod and a cooperating blade carried by the adjacent end of the tube and fixed thereto, said blades being arranged in lapping relation and provided at their outer ends with cup-like cutting elements, the cutting edges of one of said elements being notched to receive and hold the stem of fruit to be cut.

2. A fruit picker comprising a tubular member with a rod arranged to rotate therein, said rod extending at its ends beyond the ends of the tubular member, a handle fixed to one end of the tubular member and a cooperating handle carried by the projection end of the rod, a spring mounted between said handles to normally force them apart, a laterally extending cutting blade carried by the other projecting end of the rod and a cooperating blade carried by the adjacent end of the tube and fixed thereto, said blades being arranged in locking relation and provided at their outer ends with cup-like cutting elements, the cutting edges of one of said elements being notched to receive and hold the stem of fruit to be cut, said ends having upstanding terminals with their meeting edges curved.

In testimony that I claim the foregoing as my own, I have hereto affixed my signature.

MAUDE VAN NORMAN ALTVATER.